United States Patent
Karaoguz et al.

(10) Patent No.: US 8,548,502 B2
(45) Date of Patent: Oct. 1, 2013

(54) SPATIAL MAPPING OF WIRELESS ACCESS POINT SERVICE AREA

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 1086 days.

(21) Appl. No.: 11/715,561

(22) Filed: Mar. 8, 2007

(65) Prior Publication Data

US 2008/0057978 A1    Mar. 6, 2008

Related U.S. Application Data

(60) Provisional application No. 60/842,230, filed on Sep. 5, 2006.

(51) Int. Cl.
*H04W 24/00* (2009.01)

(52) U.S. Cl.
USPC ............... 455/456.3; 455/456.1; 455/457

(58) Field of Classification Search
USPC ........... 455/414.2, 422.1, 440, 446, 456.3, 455/456.5, 456.6, 115.3, 226.1–226.3, 414.1–414.4, 455/456.1–457; 370/347, 328, 338, 401, 370/908; 340/539.2, 539.21, 990, 995.1–996
See application file for complete search history.

(56) References Cited

U.S. PATENT DOCUMENTS

| | | | | |
|---|---|---|---|---|
| 6,466,797 | B1 * | 10/2002 | Frodigh et al. | 455/456.1 |
| 7,421,248 | B1 * | 9/2008 | Laux et al. | 455/67.11 |
| 7,522,917 | B1 * | 4/2009 | Purdy et al. | 455/423 |
| 2004/0152471 | A1 * | 8/2004 | MacDonald et al. | 455/456.1 |
| 2005/0148342 | A1 * | 7/2005 | Sylvain | 455/456.3 |
| 2006/0189324 | A1 * | 8/2006 | Anderson | 455/456.1 |
| 2007/0010259 | A1 * | 1/2007 | Hoffmann | 455/456.1 |
| 2008/0045233 | A1 * | 2/2008 | FitzGerald | 455/456.1 |
| 2009/0117851 | A1 * | 5/2009 | Malaney | 455/67.11 |

* cited by examiner

*Primary Examiner* — George Eng
*Assistant Examiner* — Marcus Hammonds
(74) *Attorney, Agent, or Firm* — Garlick & Markison; Shayne X. Short

(57) ABSTRACT

Spatial mapping of wireless access point service area. A means is presented by which a WACN's (Wireless Access Control Node's) service area is spatially mapped providing information corresponding to coverage region(s) within the WACN's service area. This spatial mapping may be generated and stored within either communication device at either end of a communication link (e.g., in a WACN or in a communication device operable to connect to the WACN). From the WACN's perspective, the spatial map can include its one or more coverage regions within its service area. From a communication device's perspective (e.g., a communication device that is capable to connect to a WACN), the spatial map can include multiple service areas provided by multiple WACNs and the various coverage regions therein. The partitioning of a WACN's service area into coverage areas can be performed along various lines (e.g., signal strength, history of connectivity, operational parameters employed, etc.).

23 Claims, 14 Drawing Sheets

SPATIAL MAPPING OF WIRELESS ACCESS POINT SERVICE AREA

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Application Ser. No. 60/842,230, entitled "Spatial mapping of wireless access point service area,", filed Sep. 5, 2006, pending.

BACKGROUND OF THE INVENTION

1. Technical Field of the Invention

The invention relates generally to communication networks; and, more particularly, it relates to characterization of a region in terms of a wireless terminal's ability to connect to a communication network via a wireless means.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, IEEE 802.16, Bluetooth®, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc. communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include multiple-input-single-output (MISO) and multiple-input-multiple-output (MIMO). For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

Within many wireless communication systems, certain wireless communication devices are capable to connect a communication network via a WACN (Wireless Access Control Node). Such a WACN can be construed to be any of a wide variety of wireless access point type devices including, WAPs (Wireless Access Points), base stations, or other types of wireless access control devices. Oftentimes, a communication system can include many WACNs within a particular vicinity. However, certain of the WACNs can provide better coverage (e.g., signal strength and ability to connect) than other WACNs within the very same vicinity. Moreover, based on the operational parameters employed by either a WACN or a communication device attempting to connect thereto, the connection may be less than optimal (e.g., if there is a mismatch in capability of the WACN and the communication device). In addition, there can be certain barriers within the vicinity (e.g., buildings and components thereof such as walls, hills, mountains, etc. All of these problems can make connecting to a communication system via a wireless means overly-complicated and difficult.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
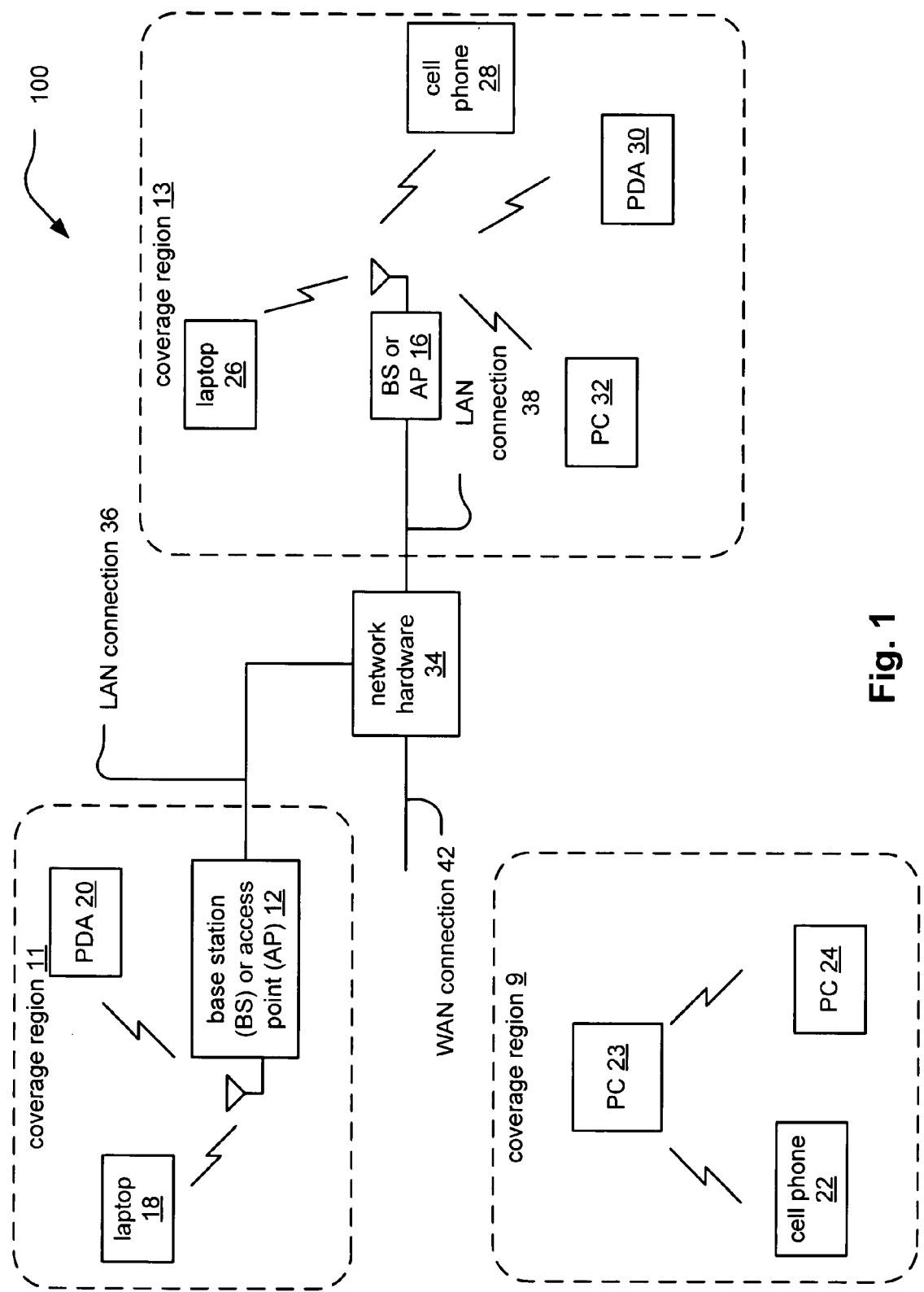
FIG. 1 is a diagram showing an embodiment of a wireless communication system.

A means is provided by which a spatial map is generated indicating one or more coverage regions within one or more service areas provided by one or more WACNs (Wireless Access Control Nodes) within a communication network. It is noted that a coverage region can include information not only corresponding to which areas within that coverage region actually provide the ability to perform connectivity via the wireless means of the WACN, but the coverage region can also include information corresponding to the communication parameters which can provide for a particular type of communication. As one example, information within the coverage region can include information corresponding to one or more operational parameters (e.g., code rate, modulation type, error correction capability, or other operational parameter) that provide for best communication between a wireless terminal and the WACN. In some embodiments, best communication may be viewed as most robust; in other embodiments, best communication may be viewed as that which provides highest throughput.

This information concerning operational parameters that provide for best communication between a wireless terminal and the WACN is then made part of the spatial map and can then be used for selecting which of these operational parameters are most appropriate for communication between a given wireless terminal and the WACN to provide for most optimal communication within various parts of the coverage region. Information corresponding to the channel conditions between various wireless terminals and the WACN (e.g., multi-path effects, fading, interference, noise, or other channel condition information) can be employed to determine which operational parameters are most appropriate between a given wireless terminal and the WACN. The coverage region includes such channel information thereby allowing the appropriate selection of operational parameters to be used when a wireless terminal connects to a communication network via the WACN.

It also is noted here that a WACN can provide support for any one or all of a local area network (LAN) such as a wireless local area network (WLAN), a personal area network (PAN), a wide are network (WAN), or any other type of network of interest. A WACN as employed in accordance with certain aspects of the invention can be implemented and operable to support communication devices ranging from those operable within a cellular system such as one that complies with global system for mobile communications (GSM), to those operable in accordance with Wi-Fi (wireless fidelity) such as an IEEE 802.11 communication network, to those operable in accordance with any other desired wireless communication system. Herein, the term WACN is used to include any such type of wireless access control point as well as those that may be operable in accordance with more than one type of wireless communication system (e.g., dual mode type of wireless access devices). As can be then understood, the term WACN can include any one of a base station (e.g., as in a cellular type context), a WAP, or other type of wireless access control device.

The communication network of interest can be a packet switched communication network in some embodiments. In even other embodiments, the communication network of interest is the Internet itself.

When more than one WACN is detected, the wireless terminal can select an appropriate WACN through which to connect to a communication network of interest. In addition, the operational parameters employed to govern the communication link between the wireless terminal and the WACN can be a predetermined group of operational parameters, or they can be selected by either one or both of the wireless terminal and the WACN. Some examples of operational parameters include packet size, modulation type (e.g., QPSK, 8-PSK, 16 QAM, etc.), code rate, coding type (e.g., LDPC (Low Density Parity Check) coding, turbo coding, TCM (Trellis Coded Modulation), etc.), MIMO configuration parameters, beamforming parameters, or some other operational parameter such as with which standard the communication is being governed (e.g., according to IEEE 802.11, IEEE 802.16, or any variant thereof).

As desired, any of various degrees of resolution can be provided with respect to the various coverage regions. In addition, the details of the spatial map can vary as selected by a user; for example, only certain types of WACNs can be included within the spatial map, or all WACNs can be included in the spatial map, or only was of a certain type that meet certain conditions can be included in the spatial map, and so on. This spatial map can be stored in and employed by either one or both of a wireless terminal or the various WACNs within a communication system. Based on the spatial map, the wireless terminal can select an appropriate WACN through which to connect to a communication network of interest. In some embodiments, the communication network of interest is the Internet itself. The communication network can be a packet switched communication network.

FIG. 1 is a diagram showing an embodiment of a communication system 100 that includes a plurality of base stations and/or access points 12, 16, a plurality of wireless communication devices 18-32 and a network hardware component 34. Note that the network hardware 34, which may be a router, switch, bridge, modem, system controller, etc. provides a wide area network connection 42 for the communication system 100. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices are described in greater detail with reference to FIG. 2.

Wireless communication devices 22, 23, and 24 are located within a coverage region 9 within the communication system 100. This communication system 100 can be implemented as any one of variety of communication systems including, though not limited to, IEEE 802.11, IEEE 802.16, Bluetooth®, advanced mobile phone services (AMPS), digital AMPS, global system for mobile communications (GSM), code division multiple access (CDMA), local multi-point distribution systems (LMDS), multi-channel-multi-point distribution systems (MMDS), mobile WiMAX (Worldwide Interoperability for Microwave Access) systems, other types of mobile or wireless systems, and/or variations thereof. In one embodiment, these communication devices 22, 23, and 24 may only communicate with each other. In an alternative embodiment, to communicate with other wireless communication devices within the communication system 100 or to communicate outside of the communication system 100, the communication devices 22, 23, and/or 24 need to affiliate with one of the base stations or access points 12 or 16 (e.g., one of the WACNs within the communication system 100).

The base stations or access points 12, 16 are located within coverage regions 11 and 13, respectively, within the communication system 100, and are coupled to the network hardware 34 via local area network connections 36, 38. Such a connection provides the base station or access point 12 or 16 (e.g., WACN 12 or WACN 16) with connectivity to other devices within the communication system 100 and provides connectivity to other networks via the WAN connection 42. To communicate with the wireless communication devices within its particular coverage region 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 100.

In some embodiments, base stations are used for cellular telephone systems and like-type systems, while access points are used for in-home or in-building wireless networks (e.g., IEEE 802.11, IEEE 802.16, and versions thereof, Bluetooth®, and/or any other type of radio frequency based network protocol). Regardless of the particular type of communication system, each wireless communication device includes a built-in radio and/or is coupled to a radio.

Figure 2:
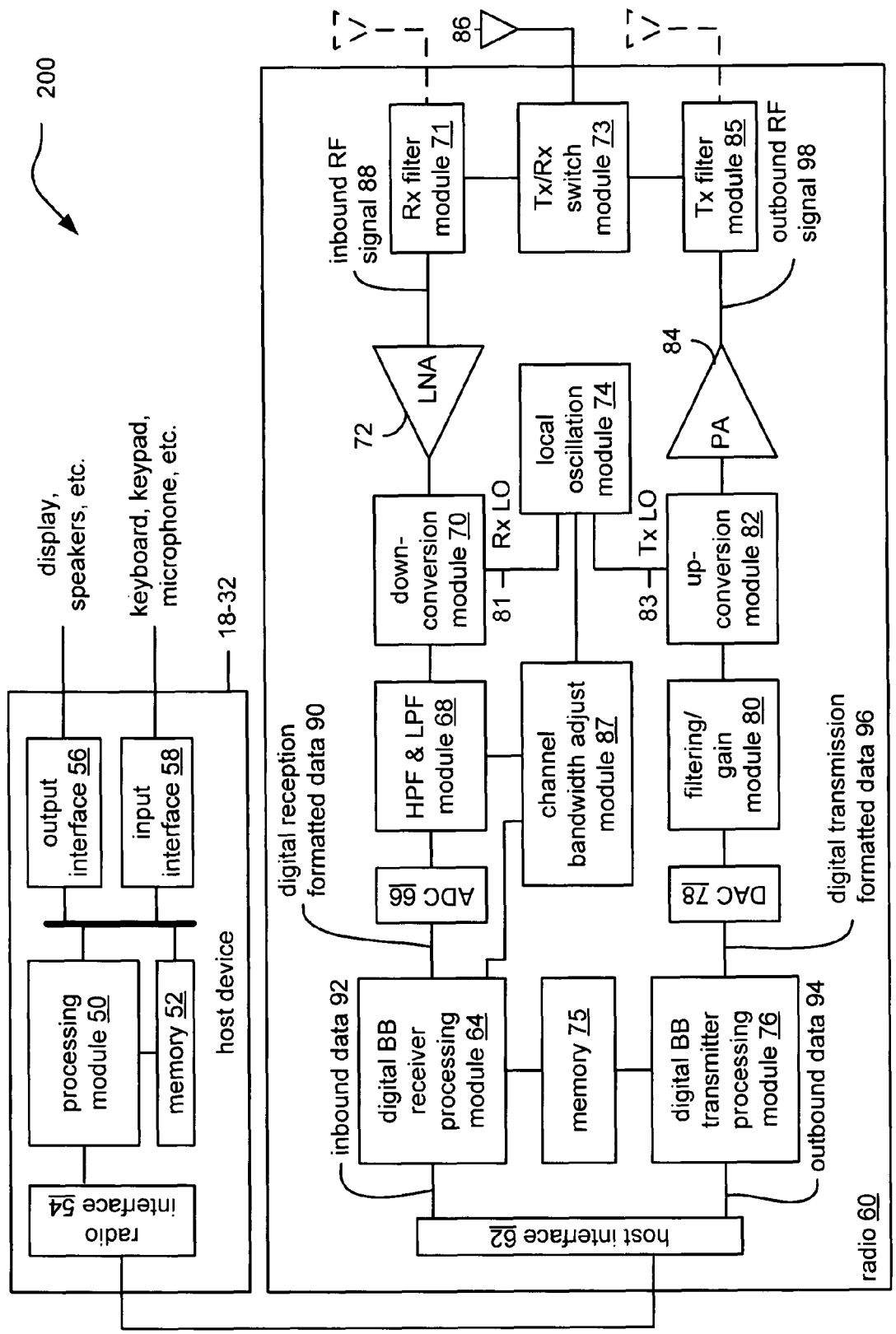
FIG. 2 is a diagram showing an embodiment of a wireless communication device.

FIG. 2 is a diagram showing an embodiment of a wireless communication device 200 that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device 200 is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation de-mapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, IEEE 802.16, Bluetooth®, etc.) to produce outbound baseband signals 96. The outbound baseband signals 96 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device 200.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kHz to a few MHz. The digital receiver processing module 64, based on settings provided by the channel bandwidth adjust module 87, decodes, descrambles, de-maps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device 200 of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
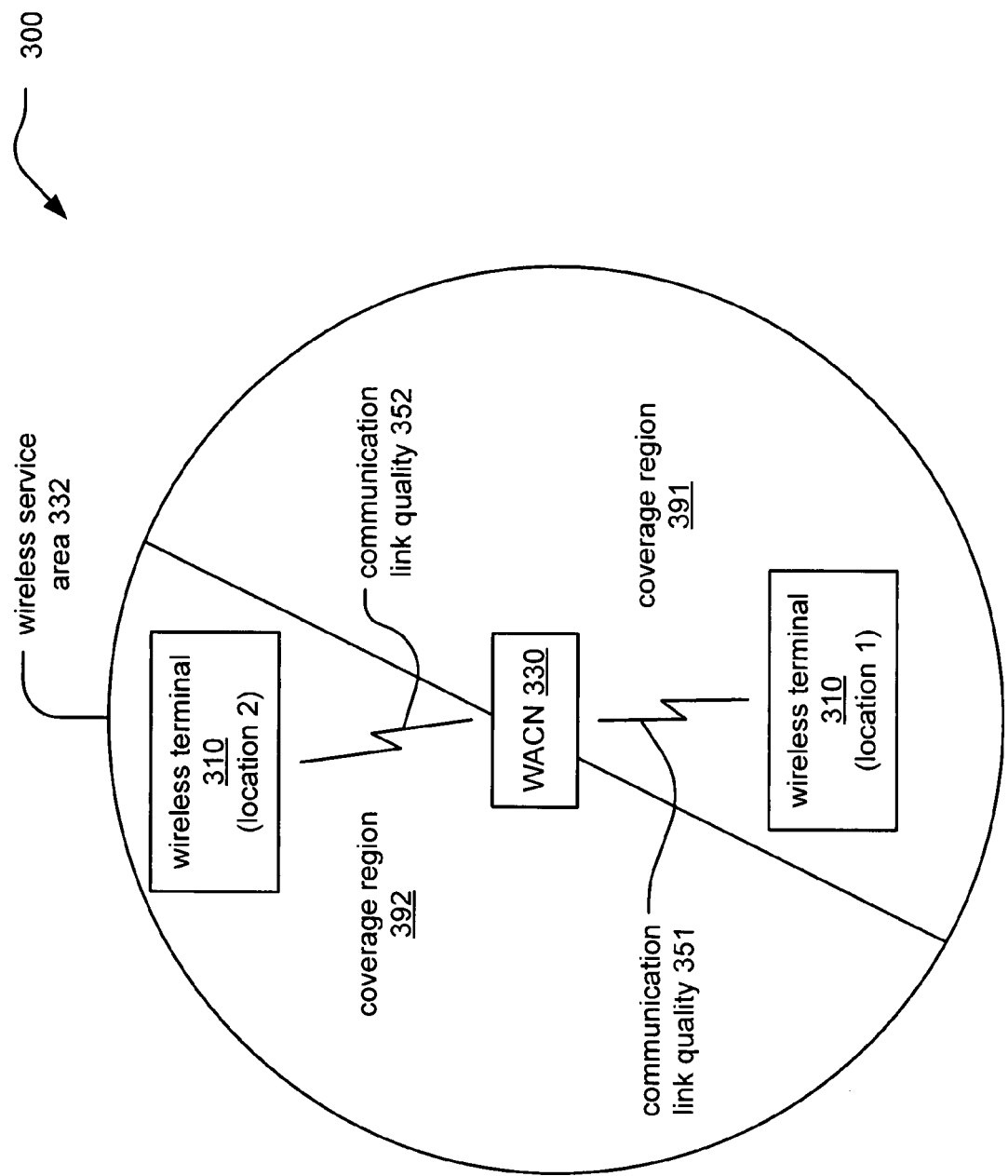
FIG. 3 is a diagram showing an embodiment of a communication system in which a WACN (Wireless Access Control Node) service area is spatially mapped into at least two coverage regions.

FIG. 3 is a diagram showing an embodiment of a communication system 300 in which a WACN (Wireless Access Control Node) service area 332, generated by a WACN 330, is spatially mapped into at least two coverage regions (coverage region 391 and coverage region 392). Generally speaking, a wireless service area is characterized as being the area in which there is ability to connect to the WACN. Within a wireless service area, a coverage region is distinct from another coverage region, in that, there is a sufficiently different degree of signal quality, ability to connect a WACN, or some other feature that differentiates the coverage region from another coverage region. For example, in some embodiments, there may be some feature (e.g., a man-made or geological feature) that deleteriously affects coverage within a wireless service area to some degree, yet does not necessarily make it impossible to connect to the WACN.

As also described above with respect to WACNs, it is noted that the WACN 330, or any other WACN described herein, can be a wireless local area network access point that is compatible with the IEEE 802.11 standard. Alternatively, any WACN described herein can be a WiMAX access point that is compatible with the IEEE 802.16 standard. In even other embodiments, any WACN described herein can be a cellular WACN or other type or WACN that is operable to allow wireless connectivity therewith.

In this embodiment, a singular wireless terminal, namely, wireless terminal 310 is shown as being in a location 1 (i.e., at one time) and is shown as being in a location 2 (i.e., at another time). There is a corresponding communication link quality 351 and communication link quality 352 between the WACN 330 and the wireless terminal 310 when it is located in each of these 2 positions. Based on the location 1 and location 2 of the wireless terminal 310, and the communication link quality 351 and communication link quality 352 between the WACN 330 and the wireless terminal 310 when the wireless terminal is located in each of these locations, one or both of the wireless terminal 310 and the WACN 330 is operable to generate a spatial map that indicates coverage provided by the WACN 330 within the vicinity of the WACN 330 and the locations 1 and 2 in which the wireless terminal 310 has been located.

In addition, the communication link qualities described in this embodiment as well as other embodiments include information corresponding to the channel conditions across those respective communication links such as an multi-path effects, fading, interference, noise, and/or other channel conditions. In other words, it is noted that the communication link qualities provides information that is used to determine and select the appropriate operational parameters to be used when supporting communication between a wireless terminal and the WACN. This information is part of and inherent to the spatial map that is generated which can then be used to select the appropriate operational parameters when supporting communication between a wireless terminal and the WACN.

There may be instances where the communication link quality 351 is different (e.g., better or worse) than the communication link quality 352. In such instances, the spatial map then partitions the wireless service area 332 into at least two coverage regions, namely, the coverage region 391 and the coverage region 392.

Information corresponding to the spatial map that indicates these coverage regions 391 and 392 provided by the WACN 330 can be stored in a memory that can be located in one or both of the WACN 330 and the wireless terminal 310. That is to say, the WACN can include the spatial map so that it has information corresponding to the quality of its coverage within the its wireless service area 332 so that it can select and employ appropriate one or more operational parameters to govern the respective communication links that will be employed with a wireless terminal that is located in one of the various coverage regions. Some examples of operational parameters include packet size, modulation type (e.g., QPSK, 8-PSK, 16 QAM, etc.), code rate, coding type (e.g., LDPC (Low Density Parity Check) coding, turbo coding, TCM (Trellis Coded Modulation), etc.), MIMO configuration parameters, beamforming parameters, or some other operational parameter such as with which standard the communication is being governed (e.g., according to IEEE 802.11, IEEE 802.16, or any variant thereof).

In addition, the wireless terminal 310 can also include this spatial map so that it also can actively participate in, or direct, the selection and employing of appropriate operational parameters to govern the respective communication link between that wireless terminal and the WACN 330.

By generating this spatial map, a wide variety of more intelligent decisions can be made regarding the operation of a communication link between any wireless terminal and any WACN within a WACN's service area.

It is also noted that more than one wireless terminals (i.e., besides the wireless terminal 310) could also be employed to assist in the generation of the spatial map. The more wireless terminals that are employed, then more communication links can be employed. This can result in a higher resolution and degree of certainty in generating the spatial map and the one or more coverage regions within the WACN's service area.

Figure 4:
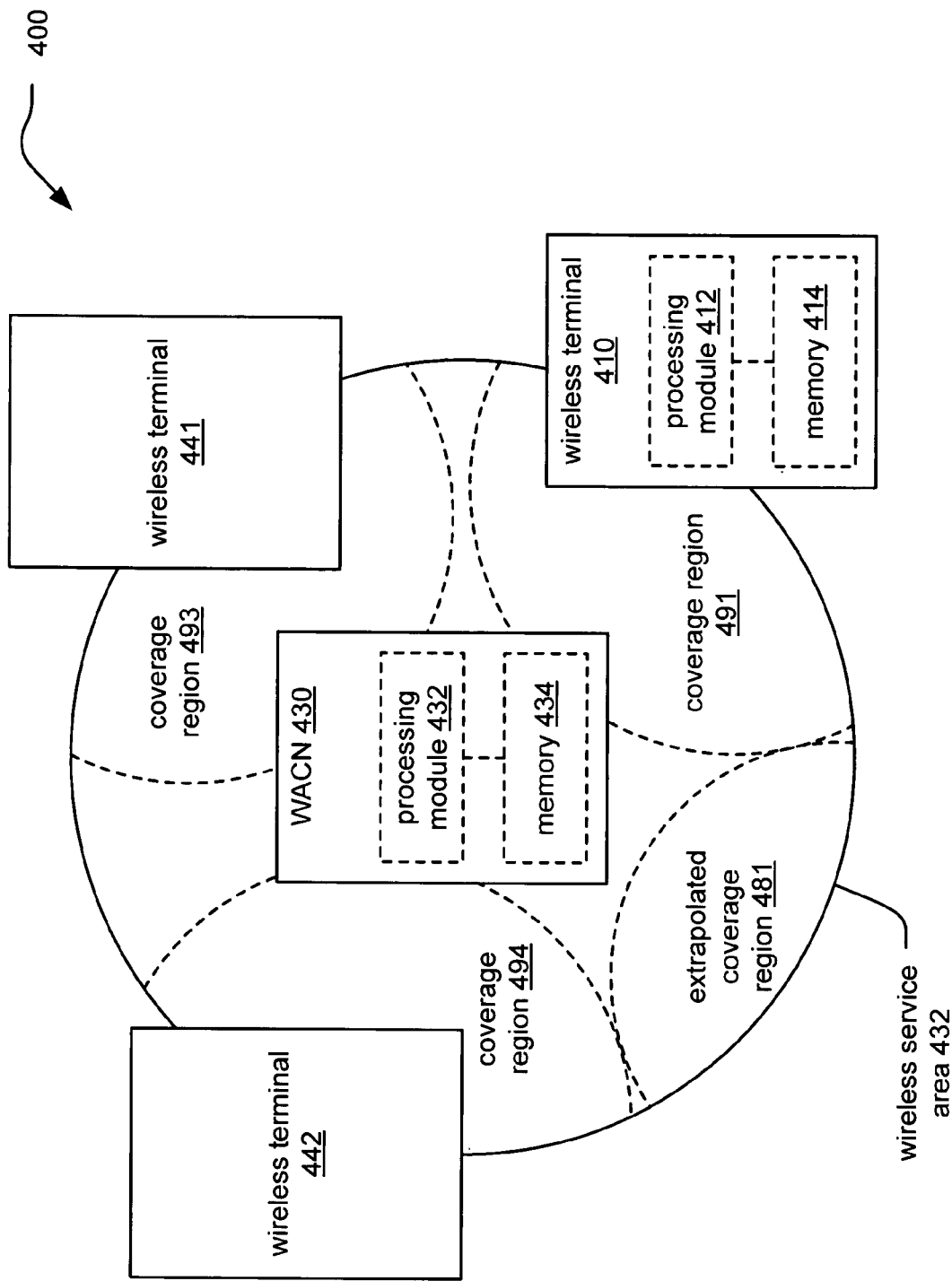
FIG. 4 is a diagram showing an embodiment of a communication system in which a coverage region, between a communication device and a WACN, is spatially mapped.

FIG. 4 is a diagram showing an embodiment of a communication system 400 in which a coverage region 491, between a wireless terminal 410 and a WACN 430, is spatially mapped. Each of the WACN 430 and the wireless terminal 410 can include a processing module and a memory coupled thereto. For example, the WACN 430 can include a processing module 432 coupled to memory 434. Similarly, the wireless terminal 410 can include a processing module 412 coupled to memory 414.

It is noted that any processing module within any apparatus in this diagram, or any other diagram included herein, can be viewed as being a processing module that may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The processing module can also have a memory coupled thereto. Such as memory device may be a single memory device or a plurality of memory devices. Such a memory device may be a read-only memory, random access memory, volatile memory, non-volatile memory, static memory, dynamic memory, flash memory, and/or any device that stores digital information. Note that when a processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Such a memory device is operable to store, and such a processing module is operable to execute, operational instructions corresponding to at least some of the steps and/or functions illustrated herein.

As within other embodiments, the WACN 430 includes a wireless service area 432. In this embodiment, the wireless terminal 410 is shown as being in only one location. Based on this one location of the wireless terminal 410, either one or both of the WACN 330 and the wireless terminal 410 is operable to generate a spatial map that indicates coverage provided by the WACN 430 within the vicinity of the WACN 430 and the location in which the wireless terminal 410 is situated. Because of this relatively limited number of locations (i.e., only one being shown in this embodiment) in which the wireless terminal 410 is or has been located within the wireless service area 432, then the coverage area 491 which is situated between the WACN 430 and the wireless terminal 410 is the only one mapped out with specificity in this embodiment. If desired, the other regions of the wireless service area 432 can be extrapolated based on the empirical information that is available via the communication link or connectivity history between the wireless terminal 410 and the WACN 430.

However, if other WACNs are available (e.g., as wireless terminal 441, wireless terminal 442 show), then other coverage regions within the wireless service area can also be spatial mapped as well (e.g., see reference numerals 493 and 494). The coverage within any region within the wireless service area 432 in which a particular wireless terminal has not actually been located in a previous time can always be extrapolated based on adjacent coverage regions or coverage regions near to those known or empirically characterized coverage regions (e.g., see extrapolated coverage region 481). Any of a wide variety of means can be employed to characterize those coverage regions in which no empirical information is available (e.g., averaging between known coverage regions adjacent to the unknown coverage region, using some predetermined form of non-linear fitting to match up the interfaces of various coverage regions, etc.).

Figure 5:
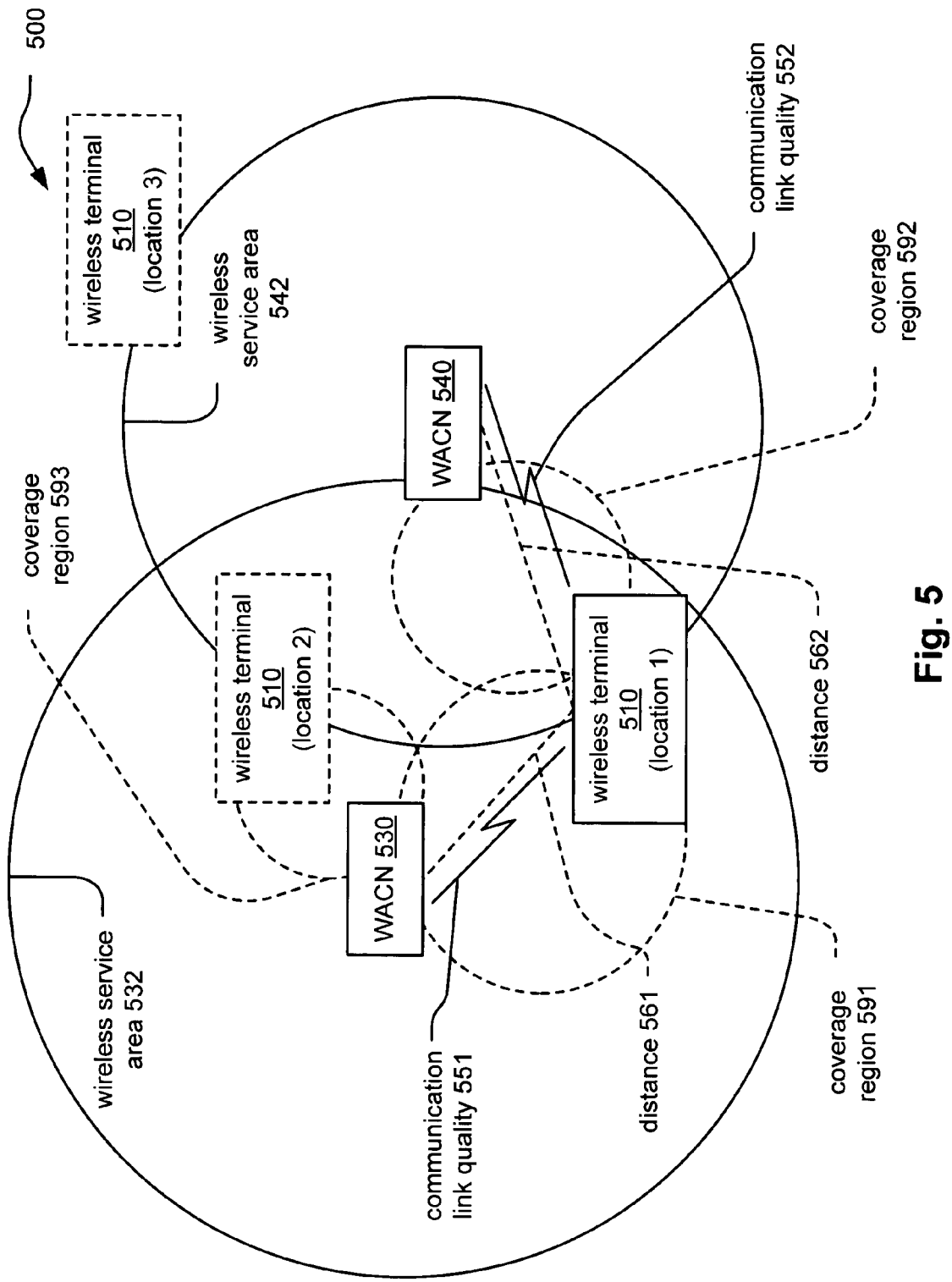
FIG. 5 is a diagram showing an embodiment of a communication system that includes more than one WACN, and at least one communication device, in which coverage regions within the various wireless service areas are spatially mapped.

FIG. 5 is a diagram showing an embodiment of a communication system 500 that includes more than one WACN (i.e., at least WACN 530 and WACN 540), and at least one wireless terminal 510, in which coverage regions within the various wireless service areas are spatially mapped. The wireless terminal 510 is shown at being located at three different locations (i.e., location 1 at a first time, location 2 at a second time, and location 3 at a third time). Each of the WACN 530 and 540 has a corresponding wireless service area, namely, wireless service area 532 and wireless service area 542, respectively. When the wireless terminal 510 is in location 1, and when communication is supported between the wireless terminal 510 and each of the WACN 530 and 540, then the communication link quality 551 and communication link quality 552 can be determined, respectively. Having information corresponding to the communication link quality 551 allows for either one or both of the wireless terminal 510 and the WACN 530 to spatial map the coverage region 591 of the wireless service area 532 based on the empirical information of the communication link quality 551. Analogously, having information corresponding to the communication link quality 552 allows for either one or both of the wireless terminal 510 and the WACN 540 to spatial map the coverage region 592 of the wireless service area 542 based on the empirical information of the communication link quality 551.

In addition, as mentioned above with respect to other embodiments, additional information such as distance (e.g., distance 561 between the wireless terminal 510 and the WACN 530 and/or distance 562 between the wireless terminal 510 and the WACN 540) can be employed when spatially mapping the various coverage regions of the various wireless service areas.

Also, it is noted that each of the wireless service area 532 and the wireless service area 542 have a portion of overlap in which a wireless terminal could feasibly connect to either of the WACN 530 or the WACN 540 in that region. Looking even more critically at this diagram, it can be seen that the coverage region 592 is characterized within the wireless service area 542. In addition, it can be seen that the coverage region 592 is actually located within the wireless service area 532 as well. When generating the spatial map, when this situation arises (i.e., a particular region is included within more than one wireless service area), then a coverage region be associated with the particular wireless service area (and therefore the particular WACN) to which it corresponds. For example, when the spatial map is generated, information can be associated with the coverage region so that the spatial map indicates with which wireless service area (and therefore which WACN) the coverage region corresponds. This can be performed because there may be instances where a particular coverage region can actually be categorized as being of a first quality with respect to a first WACN and a second quality with respect to a second WACN. Clearly, in environments in which there are a large number of WACNs whose service areas overlap, then information can also be associated with each coverage region so that it is known with which wireless service area (and therefore which WACN) the coverage region corresponds.

Again, somewhat similarly as within other embodiments, when the wireless terminal 510 is in multiple locations (i.e., location 1, location 2, location 3, and so on), then even more accuracy and resolution can be made regarding the spatial mapping of the coverage regions provided by each of the WACNs within a particular area.

Figure 6:
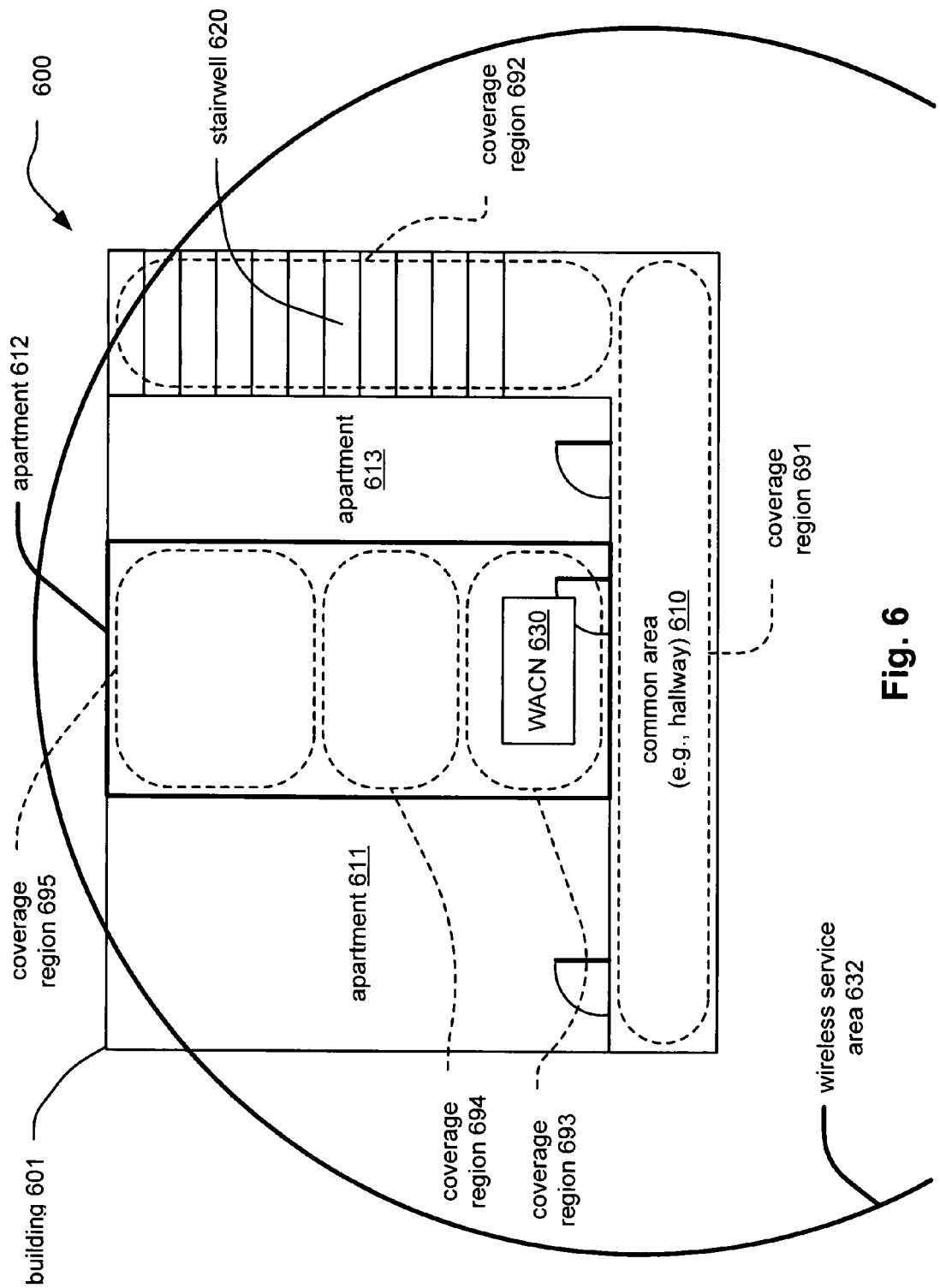
FIG. 6 is a diagram showing an embodiment of a communication system, located in the vicinity of a building, in which coverage regions of a WACN's service area are spatially mapped.

FIG. 6 is a diagram showing an embodiment of a communication system 600, located in the vicinity of a building 601, in which coverage regions of a WACN's service area are spatially mapped. As can be seen in the diagram, a WACN 630 is situated within apartment 612 of the building 601. The associated wireless service area 632 (generated by the WACN 630) encompasses the entirety of the floor seen from the overhead view of this diagram. Apartment 611 and apartment 613, which are both adjacent to and located on opposite sides of apartment 612 have had no history of connectivity therein; therefore, there is no actual empirical data that can be gleaned from communication link quality or from other information corresponding to connections between wireless terminals within the apartment 611 and the apartment 613. However, there has been historical connectivity between one or more wireless terminal within the apartment 612 and the WACN 630 that is located therein. As such, various coverage regions can be spatially mapped within the apartment 612 to show different degrees of ability to connect to the WACN and associated signals qualities. Because there is empirical information available due to historical connectivity of one or more wireless terminals within the apartment 612, the various coverage regions within the apartment 612 can be explicitly spatially mapped. There are three distinct coverage regions within the apartment 612, namely, coverage region 693, coverage region 694, and coverage region 695.

In addition, using historical connectivity information when one or more wireless terminals have been connected to the WACN 630 when located within a common area (e.g. a hallway) 610 or stairwell 620 within the building also allow for the spatial mapping of those areas as well. Stairwell 620 includes coverage region 692, and the common area 610 includes coverage region 691. Clearly, however, each of the stairwell 620 and the common area 610 could also include more than one coverage region.

Information corresponding to coverage within each of the apartment 611 and apartment 613 may not be needed or even desirable for a user who employs the WACN 630 or the any wireless terminal that connects thereto. A user who operates a wireless terminal and who wishes to connect to the WACN 630 may never plan to be within the apartment 611 and the apartment 613. For example, the operator of the WACN 630 may only have need to connect to the WACN 630 when located within the stairwell 620, the apartment 612, the common area 610, or some other common area within the building 601.

Figure 7:
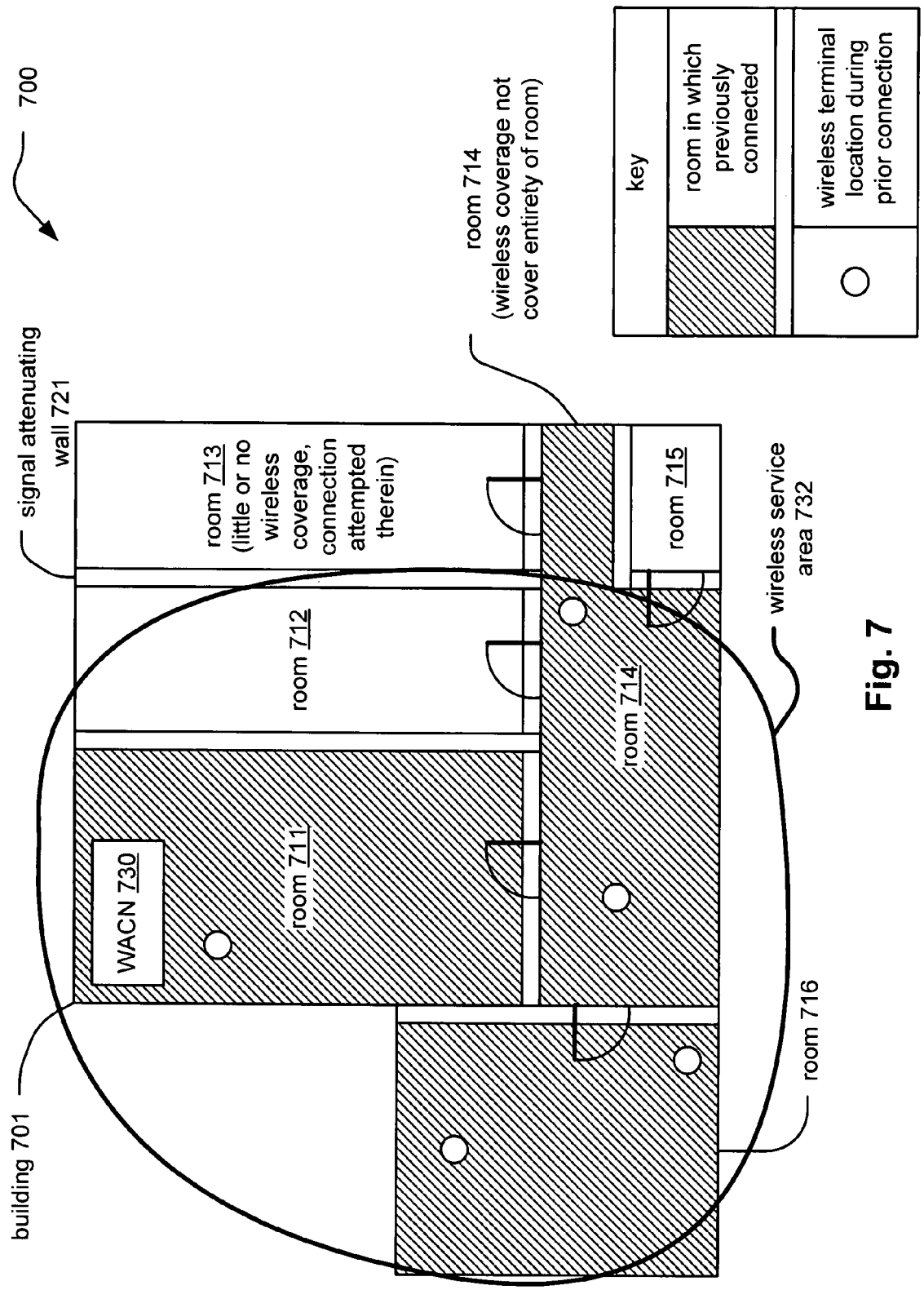
FIG. 7 is a diagram showing an embodiment of a communication system, located in the vicinity of a building, in which rooms within the building are spatially mapped based on prior connectivity therein.

FIG. 7 is a diagram showing an embodiment of a communication system 700, located in the vicinity of a building 701, in which rooms within the building are spatially mapped based on prior connectivity therein. The building 701 includes multiples rooms: room 711, room 712, room 713, room 714, room 715, and room 716. Within certain of the rooms of the building 701, one or more wireless terminals has connected to a WACN 730 that is located within the room 711. The locations at which one of these wireless terminals has connected to WACN 730 are marked using a small circle as depicted in the key of the lower right hand side of the diagram.

Within the room 713, an attempted connected was made by a wireless terminal, but unsuccessfully, and as such, the room 713 is shown as not being within the wireless service area 732 in which a wireless terminal can connect to the WACN 730. A signal attenuating wall 721 is interposed between the room 712 and the room 713, and this is perhaps the cause of the inability for a wireless terminal to connect to the WACN 730 from the room 713. However, because there is no historical connectivity information from within the room 712, it is possible that the signal degradation which makes it difficult or impossible to connect to the WACN 730 from the room 713 could be caused by the wall in between the room 711 and the room 712. However, because of prior knowledge of connectivity within the room 714, the bounds of wireless service area 732 are extrapolated as probably to include the room 712 even without any empirical information to support this supposition.

With knowledge of the building layout, each room within the building 701 can be spatially mapped as being included within the wireless service area 732 or not. Looking at the room 714, it can be seen that the WACN coverage does not appear cover the entirety of the room. Therefore, if and when the various rooms of the building 701 undergo spatial mapping to depict the various coverage regions therein, there will be at least one portion of a room from which a wireless terminal has previously connected to the WACN 730 that includes a region with no coverage at all from the WACN. In general, a region can be spatially mapped according to a variety or means including: according to the various coverage regions generated by the WACN, according to the rooms or physical divisions within the area in which there is at least some WACN service, or according to some other categorization.

Figure 8:
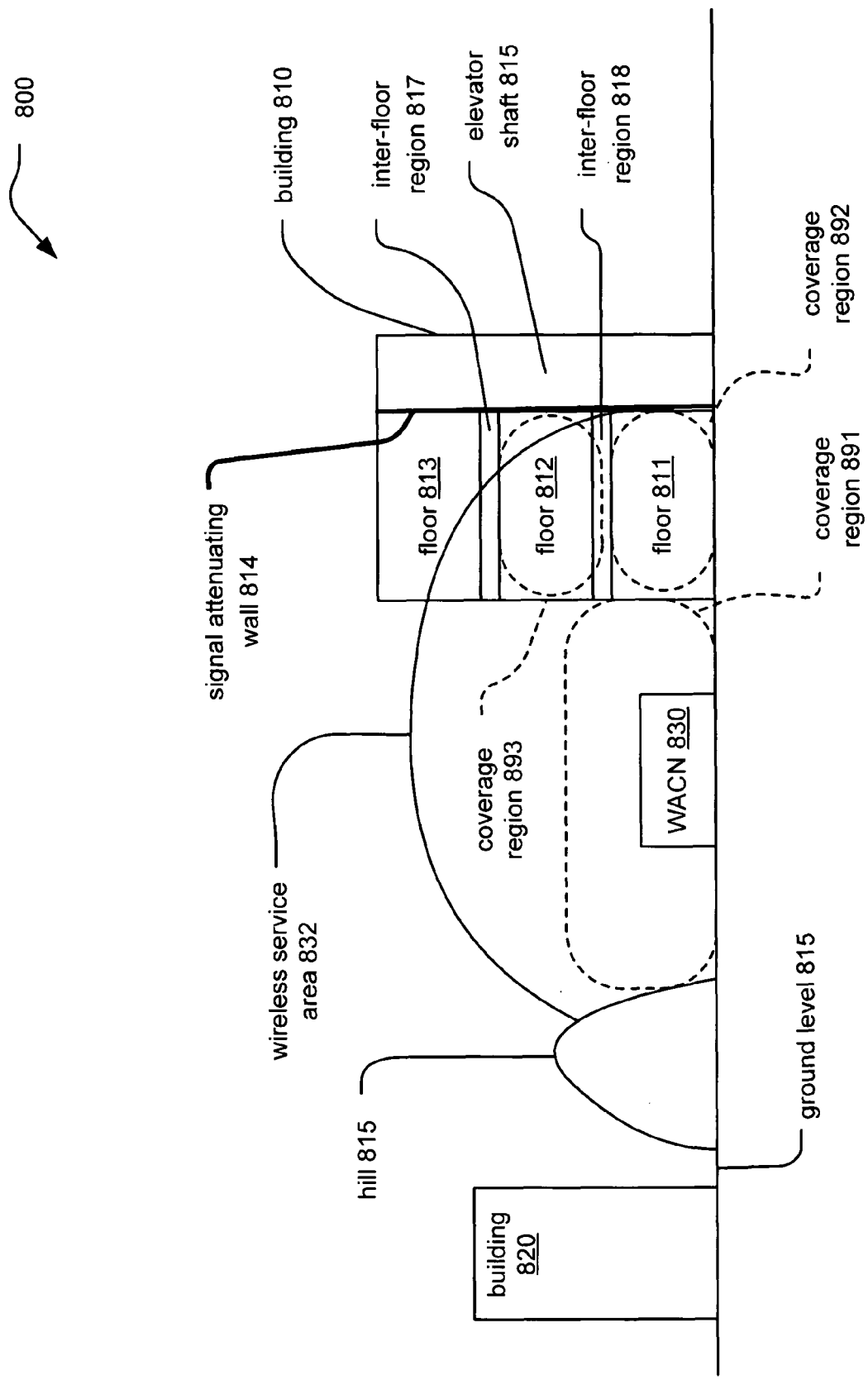
FIG. 8 is a diagram showing an embodiment of a communication system, located in the vicinity of a plurality of buildings and at least one geological feature, in which a wireless service area is spatially mapped into coverage regions.

FIG. 8 is a diagram showing an embodiment of a communication system 800, located in the vicinity of a plurality of buildings and at least one geological feature, in which a wireless service area 832 is spatially mapped into coverage regions. A WACN 830, located relatively close to or on ground level 815, generates the WACN service are 832 that includes multiple coverage regions therein. Specifically, the wireless service area 832 includes coverage region 891 that is relatively close to the WACN 830. The wireless service area 832 also includes coverage region 892, which includes floor 811, and coverage region 893 which includes floor 812 within building 810. There is a signal attenuating wall 814 that is situated between the elevator shaft 815 and the various floors of the building 810, and the wireless service area does not therefore extend into the elevator shaft 815. In some instances, there may be some signal degradation as well from the construction/materials within inter-floor region 817 or inter-floor region 818. For example, it can be seen that the coverage region 892 and coverage region 893 are distinct, which could seem to indicate that it is in fact the inter-floor region 818 that causes the different in communication link quality, signal quality, or ability to connect a wireless terminal to the WACN 830 to be sufficiently different between the floor 811 and the floor 812 such that they are each included within a different coverage region.

A hill 815 is located to the left of the WACN 830 and operates effectively to block the wireless service area 832 from reaching the building 820. Other geological features (e.g., mountains, lakes/waterways generally of relatively large size, etc.), or other man-made features (e.g., buildings, bridges, etc.) may also operate to impede the wireless service area 832 from reaching certain areas.

Figure 9:
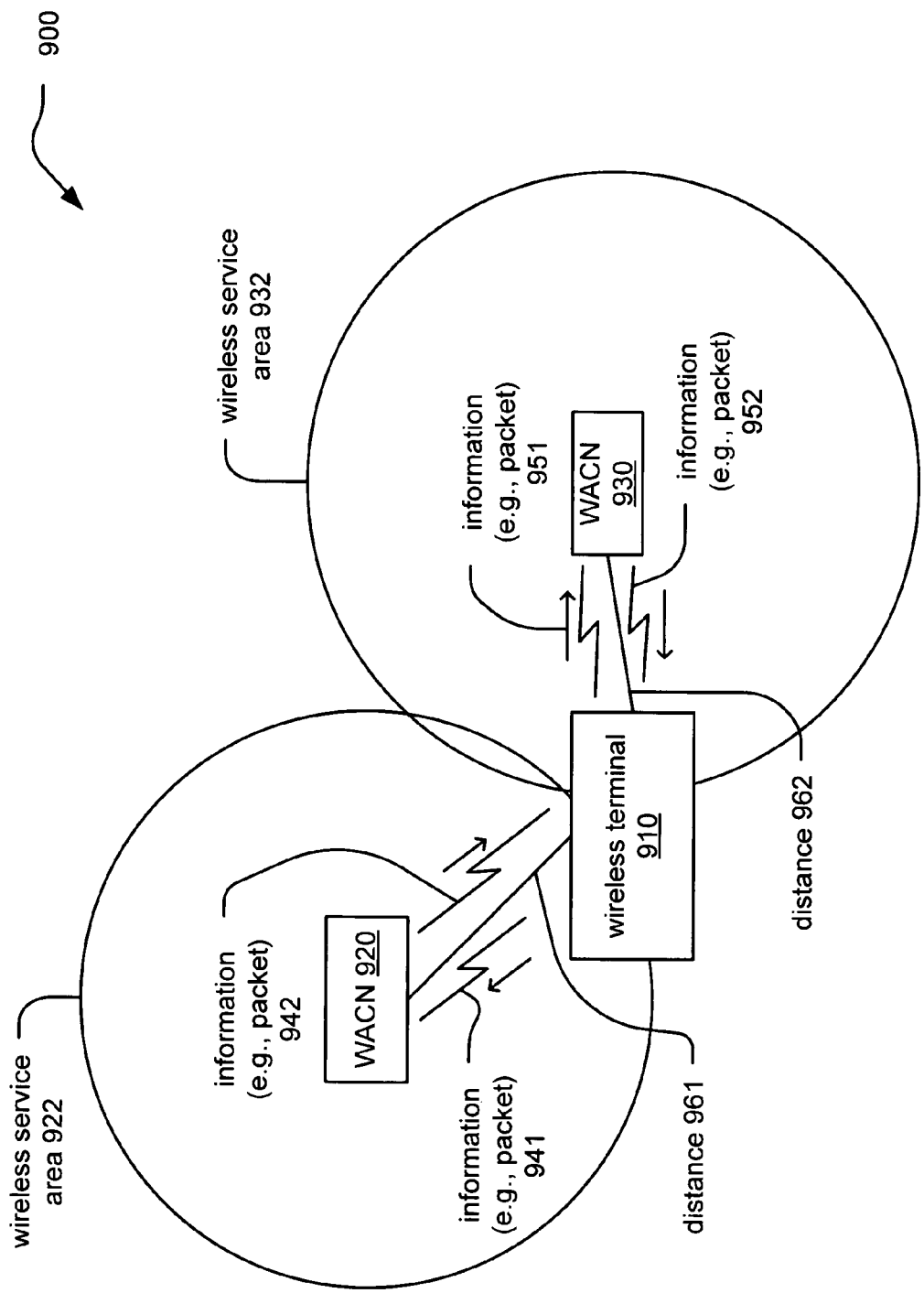
FIG. 9 is a diagram showing an embodiment of a communication system that includes a communication device and a plurality of WACNs that are operable to support bi-directional communication there between that can be employed for determining signal strength, communication link quality, or other operational and performance measures for use in spatially mapping coverage regions of the wireless service areas.

FIG. 9 is a diagram showing an embodiment of a communication system 900 that includes a wireless terminal and a plurality of WACNs (i.e., WACN 920 and WACN 930) that are operable to support bi-directional communication there between that can be employed for determining signal strength, communication link quality, or other operational and performance measures for use in spatially mapping coverage regions of the wireless service areas.

In this embodiment, first information (e.g., a packet in one embodiment) is transmitted in one direction along each communication link between the wireless terminal 910 and each WACN during a first time. Then, second information (e.g., a packet in one embodiment) is transmitted in the opposite direction along each communication link between the wireless terminal 910 and each WACN during a second time. The information packet may be transmitted from the wireless terminal 910 to a WACN during the first time, and the second information may be transmitted from that WACN to the wireless terminal 910 to a WACN during the second time. The converse may alternatively be employed. For example, the first packet may be transmitted from a WACN to the wireless terminal 910 during the first time, and the second packet may be transmitted from the wireless terminal 910 to that WACN during the second time.

Looking specifically at the diagram, first information 941 is transmitted in one direction along a communication link between the wireless terminal 910 and the WACN 920 during a first time, and second information 942 is transmitted in the opposite direction along the communication link between the WACN 920 and the wireless terminal 910 during a second time. Analogously, first packet 951 is transmitted in one direction along a communication link between the wireless terminal 910 and the WACN 930 during a first time, and second information 952 is transmitted in the opposite direction along the communication link between the WACN 930 and the wireless terminal 910 during a second time.

Regardless of which information transmission is first and which is second, a round trip communication between the wireless terminal 910 and each of the respective WACNs allows for an accurate determination of the signal strength, communication link quality, or other operational and performance measure of that corresponding communication link. This characterization can then be employed in the decision making processes regarding with which WACN the wireless terminal 910 should connect.

Using this bi-directional communication link characterization, then a device at one end of the communication link has knowledge of what is sent, and the device at the other end of the communication link will knowledge of what is received. Therefore, an accurate assessment of the various parameters of the communication link can be made. By using a bi-directional approach, then full information can be made available (i.e., what is sent and received in one direction, and what is sent and received in the other direction). Also, by using a bi-directional approach, then devices at both ends of the communication link can participate in the communication link characterization; for example, one device can perform a first portion of the characterization, and the other device can perform a second portion of the characterization.

In even another embodiment, singular information (or a singular packet) is only transmitted in one direction (e.g., from wireless terminal 910 to a WACN, or from that WACN to the wireless terminal 910), and the corresponding receiving device is operable to determine the signal strength, communication link quality, or other operational and performance measure of that corresponding communication link. While this uni-directional approach may be slightly less accurate, in some cases, than a system employing a bi-directional approach, it nevertheless shows how the characterization of the respective communication links, and their corresponding WACNs, within the communication system 900 can be achieved.

Based on this bidirectional communication between the wireless terminal 910 and each of the WACNs 920 and 930, a relative distance between the wireless terminal 910 and each of the WACNs 920 and 930 can be determined. For example, a time stamp can be attached when first information is transmitted from the wireless terminal 910 to each WACN, and based on the received time at each WACN, then the distance there between can be determined with knowledge of speed at which the wireless communication travels. Alternatively, each of the wireless terminal 910 and the WACNs 920 and 930 could each include some means to determine their absolute location on the face of the Earth (e.g., GPS (Global Positioning System)), and based on the information of the locations of the wireless terminal 910 and the WACNs 920 and 930, then the distances 961 and 962 can be determined. In addition, other means by which the relative distances between the wireless terminal 910 and the WACNs 920 and 930 can also be employed.

The distance measurements 961 and 962, as well as a first communication link quality between the wireless terminal 910 and the WACN 920 and a second communication link quality between the wireless terminal 910 and the WACN 930 can be employed to assist in the spatial mapping of each of the wireless service areas 922 and 932 as well.

Figure 10:
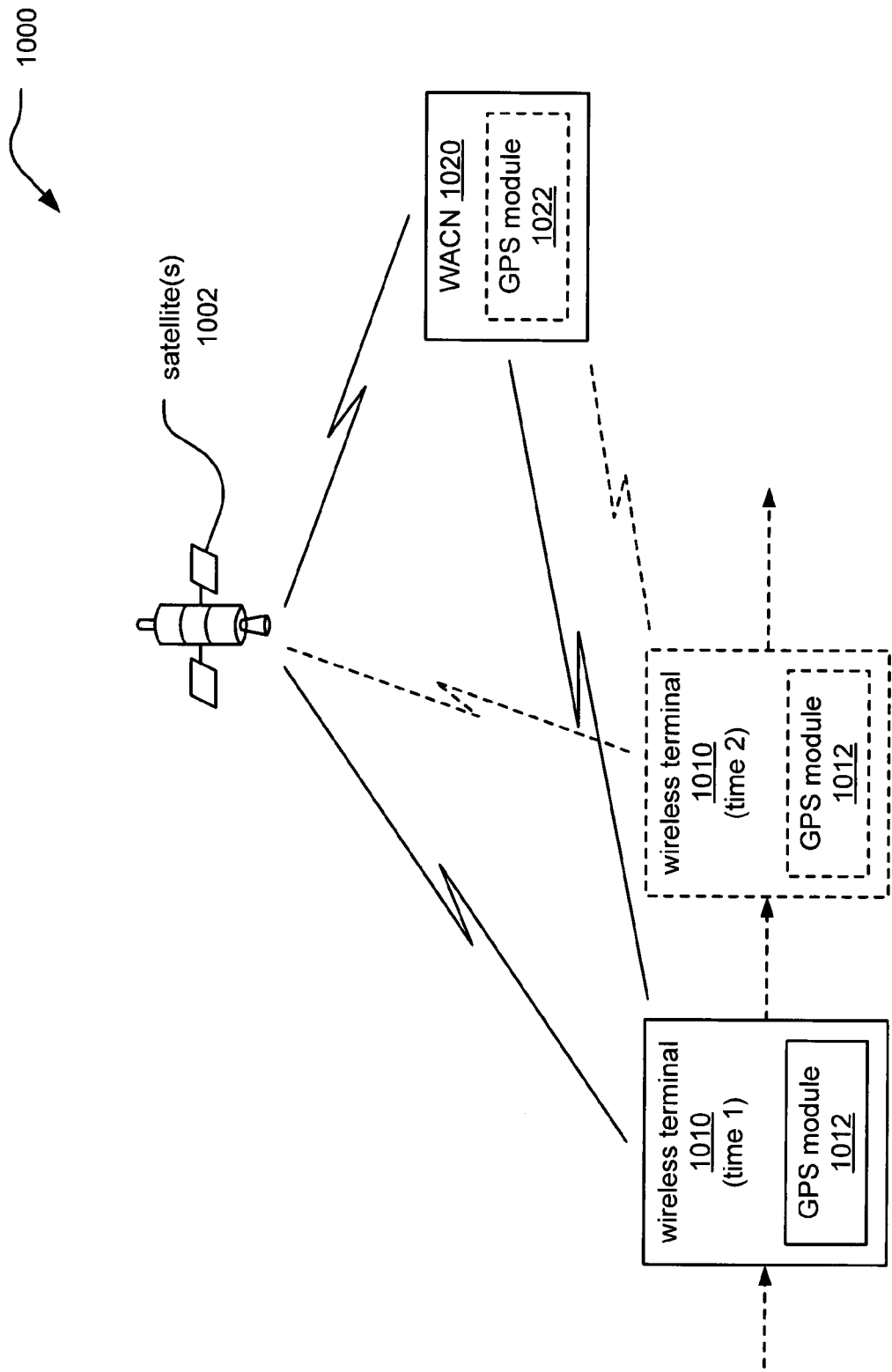
FIG. 10 is a diagram showing an embodiment of a communication system in which one apparatus or more includes a GPS (Global Positioning System) module.

FIG. 10 is a diagram showing an embodiment of a communication system 1000 in which one apparatus or more includes a GPS (Global Positioning System) module. A GPS module is operable to communicate with one or more satellites 1002 to determine its location on the face of the Earth. For example, a wireless terminal 1010 includes a GPS module 1010. A WACN 1020 also can be implemented to include a GPS module 1022.

In this embodiment, the wireless terminal 1010 is shown as being in a first location at a first time, and at a second location at a second time. Using the GPS module 1012, the mobility of the wireless terminal 1010 can be determined in terms of its change of location as a function of time. If the WACN 1020 also includes a GPS module 1022, then the mobility (if any) of the WACN 1020 can also be determined as function of time.

The locations in which the wireless terminal 1010 is located at time 1 and time 2 allows for more accurate spatial mapping of one or more wireless service areas in which the wireless terminal operate and connect to a WACN therein. For example, based on the mobility of the wireless terminal 1010, the updating of the spatial mapping of the area can be made every certain amount of time (i.e., as determined by the degree of mobility of the wireless terminal 1010) when the position of the wireless terminal 1010 changes by a particular amount (e.g., a sufficient amount) and then another location can be included within the spatial mapping thereby providing more accuracy and resolution in the spatial map.

In certain embodiments, it can be merely the GPS module 1022 of the wireless terminal 1010 that is operable to determine the location and/or mobility of the wireless terminal 1010. In embodiments in which the WACN 1020 also include GPS module 1022, then the WACN 1020 can communicate information corresponding to its location on Earth to the wireless terminal 1010. Using the information received from the WACN 1020, the wireless terminal 1010 then can use its own GPS provided information (i.e., from GPS module 1012) and the information received from the WACN 1020 corresponding to the location of the WACN 1020, then the wireless terminal 1010 can determine its relative position, rate of change of position, and/or relative mobility with respect to WACN 1020.

It is noted that the GPS module within any apparatus in this diagram can be viewed as being a processing module that may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The GPS module can also have a memory coupled thereto. Such as memory device may be a single memory device or a plurality of memory devices. Such a memory device may be a read-only memory, random access memory, volatile memory, non-volatile memory, static memory, dynamic memory, flash memory, and/or any device that stores digital information. Note that when a processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Such a memory device is operable to store, and such a processing module is operable to execute, operational instructions corresponding to at least some of the steps and/or functions illustrated herein.

Figure 11:
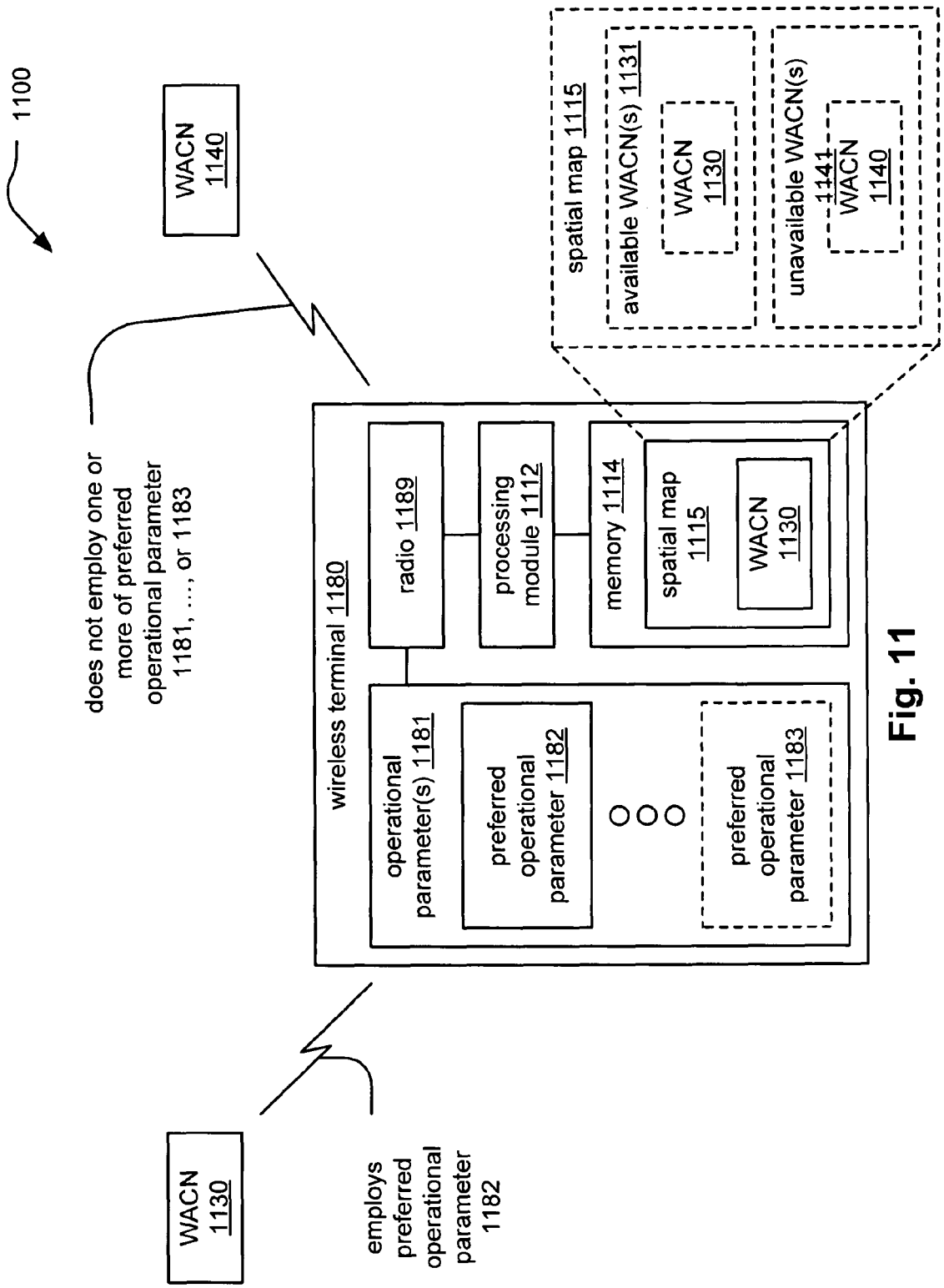
FIG. 11 is a diagram showing an embodiment of a communication system in which each WACN included therein is categorized thereby being included or excluded from a spatial map.

FIG. 11 is a diagram showing an embodiment of a communication system 1100 in which each WACN included therein is categorized thereby being included or excluded from a spatial map. This embodiment includes WACN 1130 and WACN 1140, but as few as one WACN or more than 2 WACNs could also be included. Preferable, a wireless terminal 1180 operates using one or more operational parameters 1181. This one or more operational parameters 1181 includes preferred operational parameter 1182, and can include a number of preferred operational parameters (e.g., preferred operational parameter 1183 and/or others). The wireless terminal 1180 includes a radio 1189 that is operable to detect the one or more WACNs (i.e. WACN 1130 and 1140 in this embodiment. The wireless terminal 11180 also includes a processing module and a memory that is coupled to the processing module. The memory 1114 is operable to store operational instructions that enable the processing module 1112 to determine a communication link quality of a communication link between the wireless terminal 1180 and the WACN 1130 as well as a communication link quality of a communication link between the wireless terminal 1180 and the WACN 1140. In addition, the memory 1114 is operable to store operational instructions that enable the processing module 1112 to determine the one or more operational parameters that are employed when the wireless terminal 1180 communicates with each of the WACN 1130 and WACN 1140.

In this embodiment, it is determined that the communication between the WACN 1130 and the wireless terminal 1180 is supported by employing one of the preferred operational parameters (e.g., preferred operational parameter 1182). It is also determined that the communication between the WACN 1140 and the wireless terminal 1180 is supported by not employing at least one of the preferred operational parameters; for example, when a number of preferred operational parameters (i.e., 1182, . . . , and 1183 are employed, then it is determined that at least one of the preferred operational parameters is not employed.

The determination and supporting of communication between the wireless terminal 1180 and each of the WACN 1130 and the WACN 1140 can be based on a preferred mode of operation of either one or both of the wireless terminal 1130 and each of the WACN 1130 and the WACN 1140. For example, the mode of operation of the communication link between the wireless terminal 1180 and the WACN 1130 can be based on the capabilities of each of the wireless terminal 1180 and the WACN 1130 (e.g., supported using a higher commonly capable modulation type, code rate, etc.).

By whichever means the operational parameters employed within each communication link are determined, then based on this categorization of communication between the wireless terminal 1180 and each of the WACN 1130 and WACN 1140, then each of the WACN 1130 and the WACN 1140 is categorized and either included or excluded from being within a spatial map 1115 that indicates the coverage (and can also be further sub-divided to include information corresponding to individual coverage regions within each respective WACN service) provided by the WACN 1130 and the WACN 1140 within a vicinity of wireless terminal 1180 and each of the WACN 1130 and the WACN 1140.

In one embodiment, the spatial map 1115 simply excludes any WACNs that does not meet one or more requirements (e.g., not employ the preferred operational parameter 1182 in this embodiment). Any WACN that does operate according to the preferred operational parameter 1182 is included in the spatial map 1115 (i.e., WACN 1130 in one embodiment).

Alternatively, rather than categorizing a WACN as being included or excluded from the spatial map 1115 by whether or not it uses or does not use one particular preferred operational parameter, the categorization can be performed based on whether a WACN uses or does not all of a plurality of preferred operational parameters. For example, if a WACN operates by using all of the plurality of preferred operational parameters, then that particular WACN can be included in the spatial map 1115, and if a WACN operates by using none of the plurality of preferred operational parameters, then that particular WACN can be excluded from the spatial map 1115.

If desired, even more information can be stored with respect to each particular WACN. In one instance, each WACN is characterized as being an available WACN or an unavailable WACN. In this embodiment, the WACN 1130 is included within available WACN(s) 1131 (since it operates using the preferred operational parameter 1182), and the WACN 1140 is included within unavailable WACN(s) 1141 (since it does not operate using the preferred operational parameter 1182). Along these lines, it is noted that a communication system can include more than one WACN that is included within a plurality of available WACNs and can also include more than one WACN that is included within a plurality of unavailable WACNs.

Figure 12:
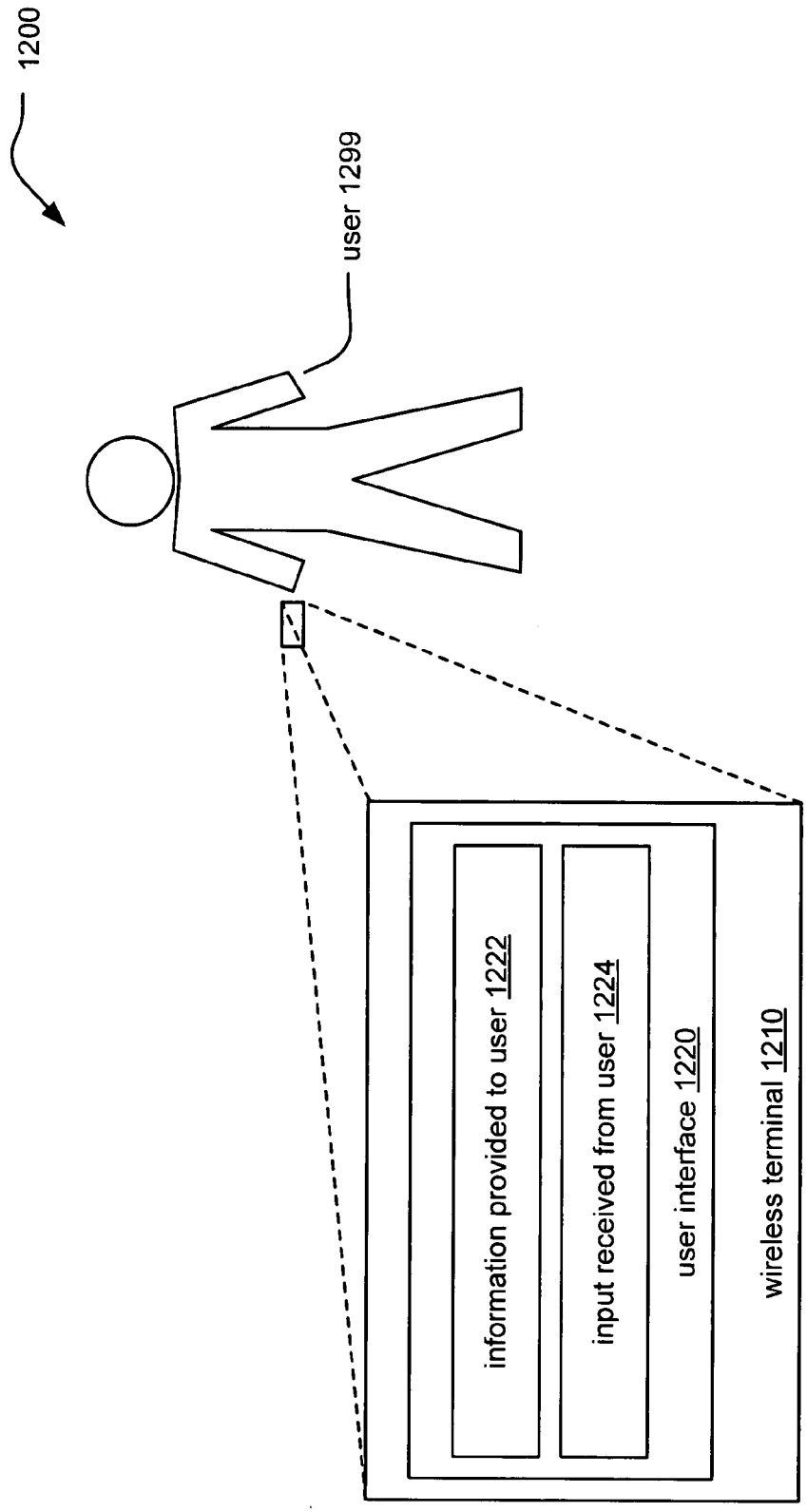
FIG. 12 is a diagram showing an embodiment of interfacing between a user and a wireless terminal.

FIG. 12 is a diagram showing an embodiment of interfacing 1200 between a user 1299 and a wireless terminal 1210. The wireless terminal 1210 includes a user interface 1220 that is operable to provide information to the user 1299 (as shown by reference numeral 1222) and is operable to receive input from the user 1299 (as shown by reference numeral 1224).

Through this user interface 1220, the user 1299 has the opportunity to program and select certain of the decision making means that are employed to perform the spatial mapping of one or more wireless service areas. In addition, the user 1299 has the opportunity to program and select certain of the decision making means that are employed to characterize any particular WACN as an available WACN or an unavailable WACN.

In addition, the user interface 1220 can be employed to display certain information to the user 1299, such as which WACNs are detected, which WACNs are available, which WACNs are deemed as being available, which WACNs are deemed as being unavailable, and so on. The spatial map or the various wireless service areas can be displayed to the user 1299 when being generated, when completed, or whenever requested by the user 1299 via the user interface 1220. Even the information provided to the user 1299 via the user interface 1220 can be programmed or selected by the user 1299. For example, the user 1299 can select, via reference numeral 1224, that only available WACNs are displayed to the user 1299 within a spatial map. For example, even if the wireless terminal 1210 detects a particular WACN, if that WACN does not meet the particular decision making criteria (e.g., such as the operational parameters by which communication is supported with a WACN), then that particular WACN is not included within the plurality of available WACNs.

Any of a wide variety of types of a wireless terminal 1210 that is operable to connect to one or more types of WACNs can be employed in this embodiment, including PDAs, personal computers (including lap-top computers), other portable computer types, cell phones, and so on. Any wireless terminal 1210 that is operable to connect to one or more types of WACNs can include this interfacing 1200 to a user 1299. From this interfacing 1200, the user can then select any one or more of the constraints (e.g., thresholds) employed to make decisions regarding connecting to a particular WACN, and the user 1299 can be provided with any desired information such as whether a particular WACN is available or unavailable (according to the categorization being employed for the communication device 1210). In addition, this information provided to the user 1299 can be provided in a format that has been selected by the user 1299.

Figure 13:
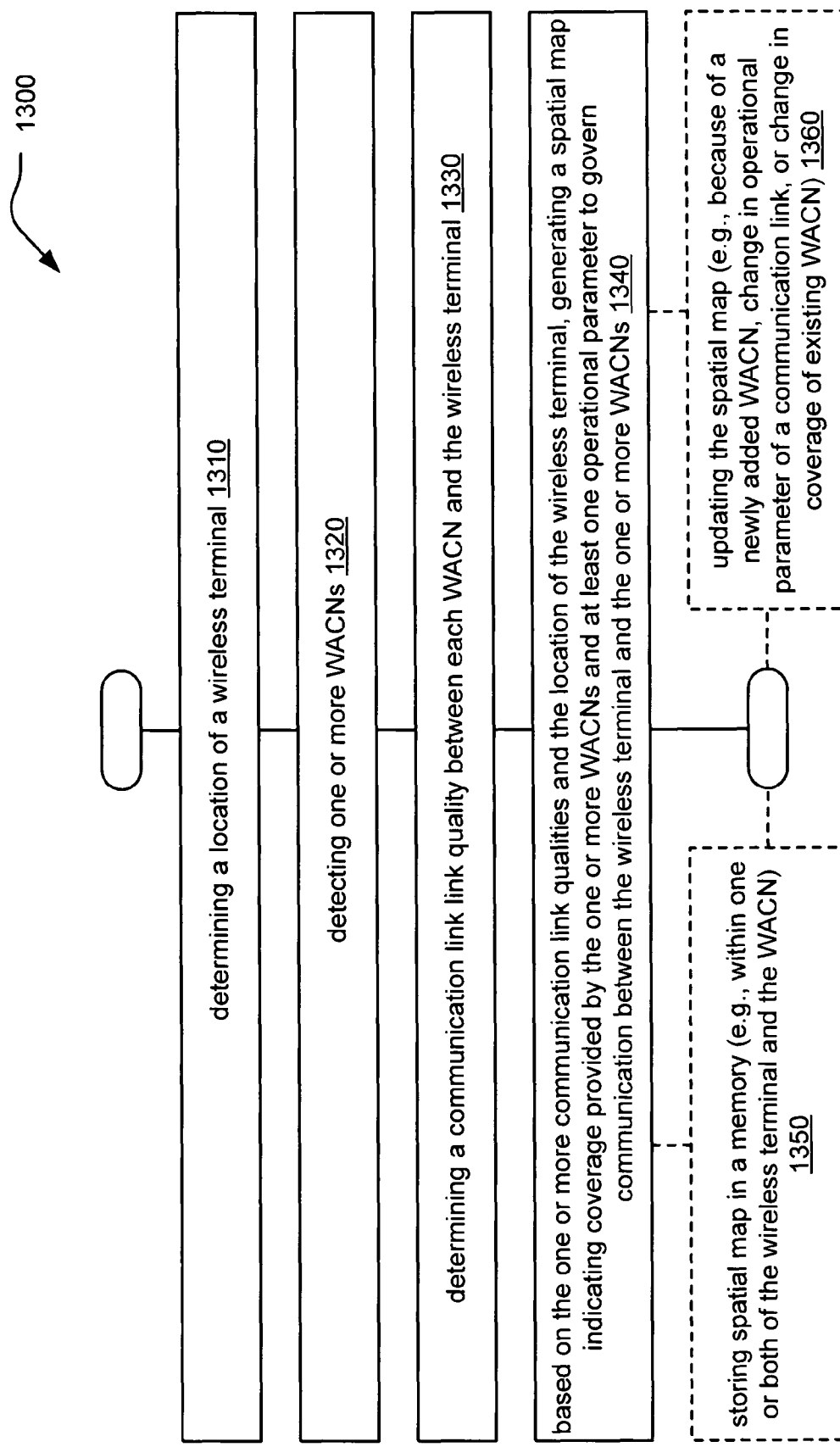
FIG. 13 and FIG. 14 are diagrams showing embodiments of methods for spatially mapping one or more coverage areas within one or more wireless service areas.
Figure 14:
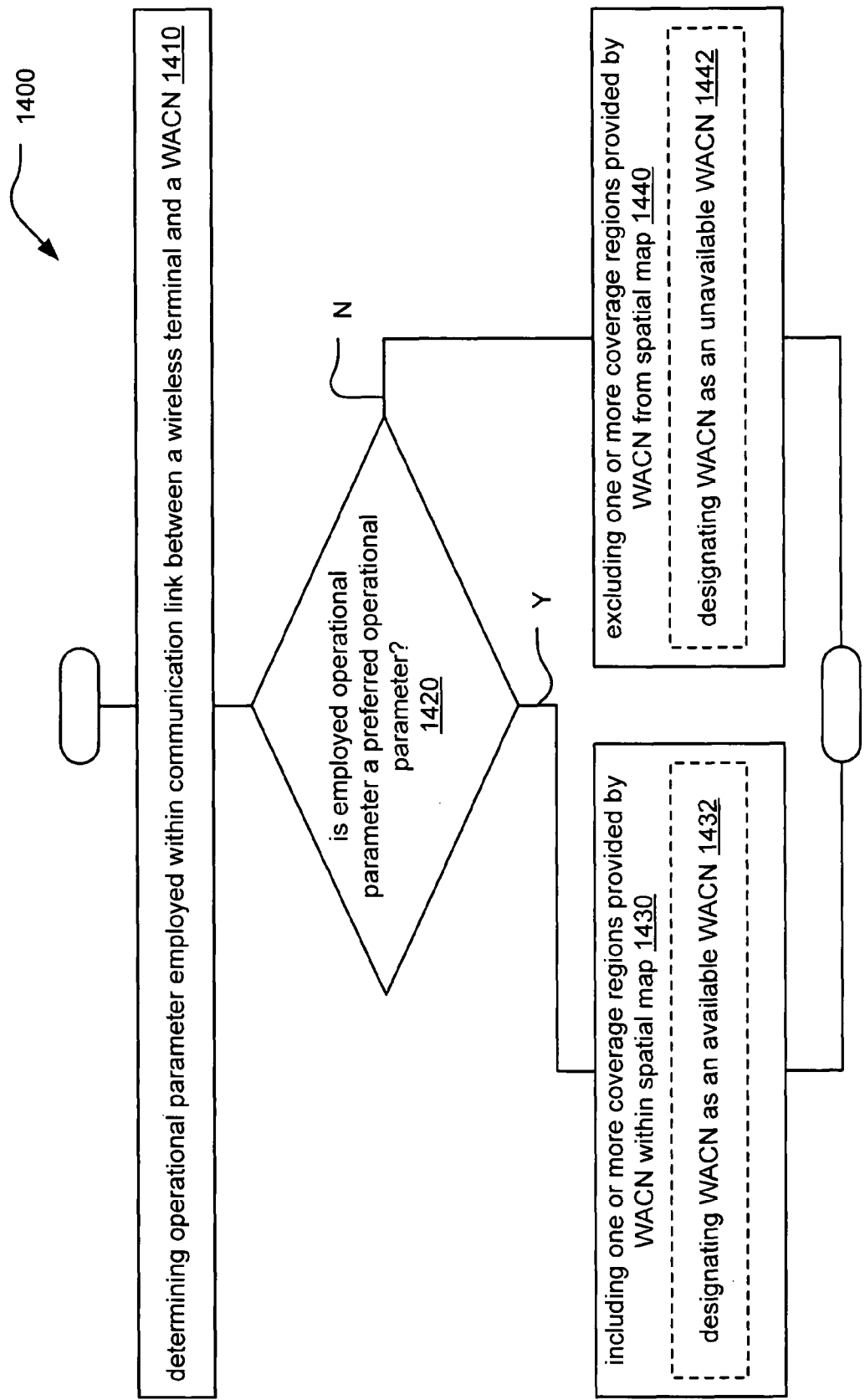

FIG. 13 and FIG. 14 are diagrams showing embodiments of methods for spatially mapping one or more coverage areas within one or more wireless service areas.

Referring to method 1300 of FIG. 13, the method 1300 involves determining a location of a wireless terminal, as shown in a block 1310. Then, the method 1300 involves detecting one or more WACNs, as shown in a block 1320. The method 1300 also involves determining a communication link quality between each WACN and the wireless terminal, as shown in a block 1330.

Thereafter, based on the one or more communication link qualities and the location of the wireless terminal, the method 1300 involves generating a spatial map indicating coverage provided by the one or more WACNs and at least one operational parameter to govern communication between the wireless terminal and the one or more WACNs, as shown in a block 1340. This spatial map generally includes the coverage provided by the one or more WACNs within the vicinity of the wireless terminal and the one or more WACNs. The spatial map can include additional information such as different coverage regions within each wireless service area generated by each WACN. For example, a first coverage region can be viewed as being a region in which a first signal strength or signal quality exists, and a second coverage region can be viewed as being a region in which a second signal strength or signal quality exists. It may be easier for a wireless terminal to connect to a WACN within the first coverage region than the second coverage region. Also, the communication link quality between a wireless terminal and the WACN may be better within the first coverage region than would be the communication link quality within the second coverage region.

Then, the method 1300 can also involve storing the spatial map in a memory as shown in a block 1350. This spatial map can be stored in a memory within the wireless terminal, or the spatial map can be stored in a memory within the WACN. Alternatively, the spatial map can be stored in a first memory within the wireless terminal, and the spatial map can also be stored in a second memory within the WACN.

Moreover, the method 1300 can also involve updating the spatial map as shown in a block 1360. There are variety of reasons why the spatial map should be updated, including a situation in which a new WACN is added to (and/or detected) within the vicinity, whether there is a change in some operational parameter of at least communication link between a wireless terminal and a WACN, or a change in coverage of some WACN, etc. Generally, it may be prudent to update the spatial map every so often (e.g., after a certain amount of time has elapsed since the spatial map was generated or since the last update of the spatial map) merely to ensure that the spatial map is up to date and accurate.

Referring to method 1400 of FIG. 14, the method 1400 involves determining operational parameter employed within communication link between a wireless terminal and a WACN. Then, the method 1400 involves determining whether or not the employed operational parameter is a preferred operational parameter, as shown in a decision block 1420.

When it is determined that the employed operational parameter is not a preferred operational parameter, then the method 1400 involves excluding the one or more coverage regions provided by that WACN from a spatial map, as shown in a block 1440. This may also involve designating that particular WACN as an unavailable WACN, as shown in a block 1442.

When it is determined that the employed operational parameter is in fact a preferred operational parameter, then the method 1400 involves including the one or more coverage regions provided by that WACN within the spatial map, as shown in a block 1430. This may also involve designating that particular WACN as an available WACN, as shown in a block 1432.

It is noted that the characterization and categorization of any particular WACN, wireless service area, or coverage area within a wireless service area can be updated within a spatial map at a later time. For example, some of the properties and/or operating conditions of any of these items can change over time, and an updating of the characterization and categorization of these items can help provide for a better and more accurate spatial map.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A wireless terminal in a communication network, the communication network including a WACN (Wireless Access Control Node), the wireless terminal comprising:
   a radio that is operable to detect the WACN; and
   a processing module to determine a communication link quality of a communication link between the wireless terminal and the WACN; and wherein:
   based on a history of locations of the wireless terminal and a corresponding history of communication link qualities of communication links between the wireless terminal and the WACN, the processing module is operable to generate a spatial map that indicates coverage corresponding to a plurality of coverage regions partitioned from a wireless service area as provided by the WACN in which the radio can connect to the WACN and that also indicates a plurality of operational parameters, such that each of the plurality of operational parameter corresponds to one of the plurality of coverage regions, to govern communication between the wireless terminal and the WACN respectively within each of the plurality of coverage regions;
   the communication link between the wireless terminal and the WACN operated using at least one operational parameter selected from the plurality of operational parameters by the wireless terminal and the WACN based on the spatial map;
   the radio is implemented to operate using a plurality of preferred operational parameters when communicating with at least one additional wireless terminal;
   the communication link between the WACN and the radio is governed, at least in part, by an operational parameter;
   when the operational parameter is included within the plurality of preferred operational parameters, then the spatial map includes the WACN; and
   when the operational parameter is not included within plurality of preferred operational parameters, then the spatial map excludes the WACN.

2. The wireless terminal of claim 1, wherein:
   the WACN is a wireless local area network access point, a WiMAX access point, or a cellular access point.

3. The wireless terminal of claim 1, further comprising:
   a GPS (Global Positioning System) module that is operable to determine the location of the wireless terminal on Earth.

4. The wireless terminal of claim 1, further comprising:
   a GPS (Global Positioning System) module that is operable to identify a location of the wireless terminal on Earth; and wherein:
   the wireless terminal is operable to receive information from the WACN and to determine a distance between the wireless terminal and the WACN there from;
   the spatial map, that is generated by the processing module, indicates the distance between the wireless terminal and the WACN.

5. The wireless terminal of claim 1, wherein:
the WACN is included within a plurality of WACNs;
based on a history of connectivity between the radio and the plurality of WACNs, WACNs with which the radio has previously connected are included within a plurality of available WACNs;
based on the history of connectivity between the radio and the plurality of WACNs, WACNs with which the radio has not previously connected are included within a plurality of unavailable WACNs; and
among the plurality of unavailable WACNs and the plurality of available WACNs, the spatial map includes coverage provided by only the plurality of available WACNs.

6. The wireless terminal of claim 1, wherein:
the spatial map also includes a physical feature within the vicinity of the wireless terminal, the first WACN, and the second WACN; and
the physical feature is at least one of a geological feature and a building or component thereof.

7. The wireless terminal of claim 1, further comprising:
a user interface that is operable to provide information to and to receive input from a user; and wherein:
the spatial map is also operable to include a physical feature within the vicinity of the wireless terminal and the WACN;
the wireless terminal is operable to present the spatial map and a connection authorization request to the user via the user interface; and
the radio is operable to connect to the communication network via the WACN when the user authorizes the connection authorization request via the user interface.

8. The wireless terminal of claim 1, further comprising:
a user interface that is operable to provide information to and receives input from a user; and wherein:
the radio is operable to detect a change in the communication link quality between the WACN and the wireless terminal; and
the wireless terminal is operable to present information to the user via the user interface indicating the change in communication link quality between the WACN and the wireless terminal.

9. The wireless terminal of claim 1, wherein:
the processing module to:
determine coverage corresponding to at least one additional plurality of coverage regions within at least one additional wireless service area as provided by at least one additional WACN within a vicinity of the wireless terminal and the at least one additional WACN; and
update the spatial map to indicate the coverage provided by the at least one additional WACN.

10. The wireless terminal of claim 1, wherein:
the spatial map is generated at a first time; and
the processing module to update the spatial map to indicate an updated coverage corresponding to an updated plurality of coverage regions within the wireless service area as provided by the WACN at a second time.

11. The wireless terminal of claim 1, wherein:
the wireless terminal is a cellular telephone, a two-way radio, a personal digital assistant (PDA), a personal computer (PC), a laptop computer, or a home entertainment equipment.

12. A wireless terminal in a communication network, the communication network including WACNs (Wireless Access Control Nodes), the wireless terminal comprising:
a radio that:
when the wireless terminal is located in a first location, is operable to detect a first plurality of WACNs; and
when the wireless terminal is located in a second location, is operable to detect a second plurality of WACNs; and
a processing module to:
determine a first plurality of communication link qualities such that each communication link quality of the first plurality of communication link qualities corresponds to one communication link between the wireless terminal and one WACN within the first plurality of WACNs; and
determine a second plurality of communication link qualities such that each communication link quality of the second plurality of communication link qualities corresponds to one communication link between the wireless terminal and one WACN within the second plurality of WACNs; and wherein:
based on a first location of the wireless terminal, the second location of the wireless terminal, the first plurality of communication link qualities, and the second plurality of communication link qualities, the processing module is operable to generate a spatial map indicating a plurality of coverage regions partitioned from a plurality of wireless service areas as provided by the first plurality of WACNs and the second plurality of WACNs with respect to a plurality of locations of the wireless terminal within a vicinity of the first plurality of WACNs and the second plurality of WACNs and also indicating a plurality of operational parameters, such that each of the plurality of operational parameters corresponds to one of the plurality of coverage regions, to govern communication between the wireless terminal and each WACN of the first plurality of WACNs and the second plurality of WACNs;
at least one communication link between the wireless terminal and at least one of the first plurality of WACNs or the second plurality of WACNs operated using at least one operational parameter selected from the plurality of operational parameters by the wireless terminal and the at least one of the first plurality of WACNs or the second plurality of WACNs based on the spatial map;
the radio is implemented to operate using a plurality of preferred operational parameters when communicating with at least one additional wireless terminal;
a communication link between one WACN of the first plurality of WACNs and the second plurality of WACNs and the radio is governed, at least in part, by an operational parameter;
when the operational parameter is included within the plurality of preferred operational parameters, then the spatial map includes the one WACN of the first plurality of WACNs and the second plurality of WACNs; and
when the operational parameter is not included within plurality of preferred operational parameters, then the spatial map excludes the one WACN of the first plurality of WACNs and the second plurality of WACNs.

13. The wireless terminal of claim 12, wherein:
one WACN within the first plurality of WACNs or the second plurality of WACNs is a wireless local area network access point, a WiMAX access point, or a cellular access point.

14. The wireless terminal of claim 12, further comprising:
a GPS (Global Positioning System) module that is operable to determine the first location of the wireless terminal on Earth and the second location of the wireless terminal on Earth.

15. The wireless terminal of claim 12, wherein:
the spatial map also includes a physical feature within a vicinity of the wireless terminal, the first WACN, and the second WACN; and the physical feature is at least one of a geological feature and a building or component thereof.

16. The wireless terminal of claim 12, wherein:
the radio is operable to detect a third plurality of WACNs;
the processing module to:
   determine a third plurality of communication link qualities such that each communication link quality of the third plurality of communication link qualities corresponds to one communication link between the wireless terminal and one WACN within the third plurality of WACNs; and
   update the spatial map to indicate the third plurality of communication link qualities between each WACN of the third plurality of WACNs and the wireless terminal.

17. The wireless terminal of claim 12, further comprising:
a user interface that is operable to provide information to and to receive input from a user; and wherein:
the radio is operable to detect a change in at least one communication link quality between the one WACN, within the first plurality of WACNs or the second plurality of WACNs, and the wireless terminal; and
the wireless terminal is operable to present information to the user via the user interface indicating the change in the at least one communication link quality.

18. A method performed by a wireless terminal in a communication network, the communication network including a plurality of wireless access control nodes (WACNs), the method comprising:
   determining a history of locations of a wireless terminal;
   detecting a first WACN;
   detecting a second WACN;
   determining a first plurality of communication link qualities of a first plurality of communication links between the first WACN and the wireless terminal corresponding to a first subset of the history of locations of the wireless terminal;
   determining a second plurality of communication link qualities of a second plurality of communication links between the second WACN and the wireless terminal corresponding to a second subset of the history of locations of the wireless terminal;
   based on the history of locations of the wireless terminal, the first plurality of communication link qualities, and the second plurality of communication link qualities, generating a spatial map indicating coverage corresponding to a plurality of coverage regions partitioned from a plurality of service areas as provided by the first WACN and the second WACN in which the wireless terminal can connect to at least one of the first WACN and the second WACN and also indicating a plurality of operational parameters, such that each of the plurality of operational parameters corresponds to one of the plurality of coverage regions, to govern communication between the wireless terminal and at least one of the first WACN and the second WACN respectively within each of the plurality of coverage regions;
   operating at least one communication link between the wireless terminal and the at least one of the first WACN and the second WACN operated using at least one operational parameter selected from the plurality of operational parameters by the wireless terminal and the at least one of the first WACN and the second WACN based on the spatial map;
   operating the wireless terminal using a plurality of preferred operational parameters when communicating with at least one additional wireless terminal;
   governing the at least one communication link between the wireless terminal and the at least one of the first WACN and the second WACN, at least in part, by an operational parameter;
   when the operational parameter is included within the plurality of preferred operational parameters, updating the spatial map to include the at least one of the first WACN and the second WACN; and
   when the operational parameter is not included within plurality of preferred operational parameters, updating the spatial map to exclude the at least one of the first WACN and the second WACN.

19. The method of claim 18, wherein: the first WACN or the second WACN is a wireless local area network access point, a WiMAX access point, or a cellular access point.

20. The method of claim 18, further comprising:
detecting a third WACN; and
updating the spatial map to indicate coverage provided by the third WACN.

21. The method of claim 18, further comprising:
detecting a change in at least one of the first plurality of communication link qualities between the first WACN and the wireless terminal or at least one of the second plurality of communication link qualities between the second WACN and the wireless terminal; and
based on the change, updating the spatial map to indicate an updated coverage provided by the first WACN and the second WACN.

22. The method of claim 18, wherein:
the spatial map also includes a physical feature within a vicinity of the wireless terminal, the first WACN, and the second WACN; and
the physical feature is at least one of a geological feature and a building or component thereof.

23. The method of claim 18, further comprising:
determining the location of the wireless terminal using GPS (Global Positioning System).

* * * * *